(No Model.)
T. McCORMICK.
TRICYCLE.
No. 474,096. Patented May 3, 1892.
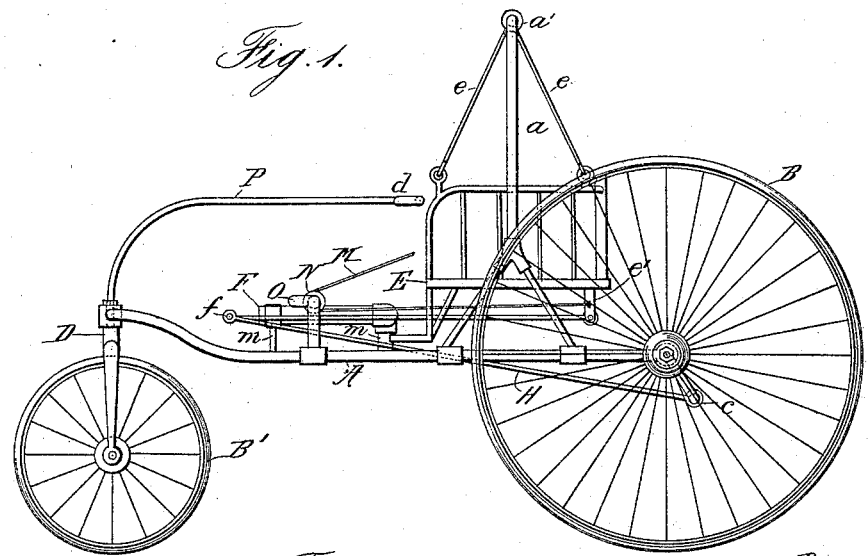
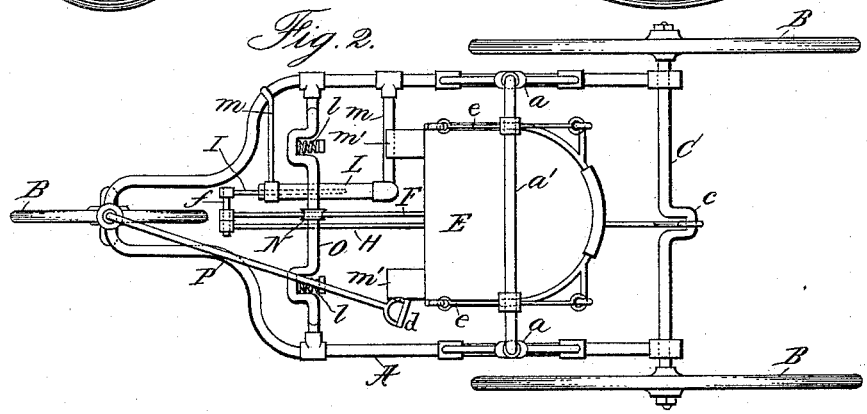
WITNESSES:
John Buckler,
Geo. Smallwood.
INVENTOR
Thomas McCormick,
BY
Wm. H. Appleton,
ATTORNEY.

UNITED STATES PATENT OFFICE.

THOMAS McCORMICK, OF BROOKLYN, NEW YORK.

TRICYCLE.

SPECIFICATION forming part of Letters Patent No. 474,096, dated May 3, 1892.

Application filed November 27, 1891. Serial No. 413,220. (No model.)

*To all whom it may concern:*

Be it known that I, THOMAS MCCORMICK, a citizen of the United States, and a resident of the city of Brooklyn, county of Kings, and State of New York, have invented certain new and useful Improvements in Tricycles, of which the following is a specification.

My invention, while relating to tricycles generally, has reference more particularly to that class of such vehicles which are propelled by the power of the rider, and has for its object to produce a vehicle of this class which shall be not only simple in construction, but easy of operation.

To these ends the invention consists, first, in the combination, with a suitable frame having the usual propelling and guiding wheels and the swinging seat, of the means for connecting such seat to the crank-shaft of the driving-wheels and appliances for assisting the rider in imparting to the seat a swinging or pendulous motion, and, second, in various other constructions and combinations of parts, all as will hereinafter more fully appear.

Referring to the accompanying drawings, which form a part of this specification, Figure 1 is a side elevation of a tricycle constructed in accordance with my invention; and Fig. 2, a plan view of the same, the rope or cord for assisting in the swinging of the seat being omitted.

In both the figures like letters of reference indicate corresponding parts.

A indicates the frame or body of the tricycle or other vehicles, which for the sake of lightness and stiffness is preferably made of metal tubing bent into the appropriate shape, and B B' are the wheels upon which it is mounted. The wheels B constitute the propelling-wheels and are fixedly secured to the shaft C, which is fitted to rotate in suitable bearings secured to the rear portion of the frame or body, while the wheel B' constitutes the guiding-wheel and is journaled in the fork D, that in turn is pivoted in the forward end of such frame or body in such a manner as to be capable of a rotation therein about a vertical axis.

Erected upon the upper side of the frame or body A at some distance forward of its rear end are posts $a$ $a$, which are firmly secured thereto, so as to be held rigidly in place, and are connected at their upper ends by a cross-bar or girth $a'$, extended across from one to the other, whereby to securely hold them in proper relation with respect to one another and forming therewith an upright frame, as shown.

Suspended from the cross-bar or girth $a'$, so as to be capable of a swinging or pendulous motion thereon, is the seat E for accommodation of the rider. This seat may be of any ordinary or preferred construction and may be suspended from the cross-bar or girth in various ways. In the drawings I have shown this suspension as effected by means of the rods or cords $e$ $e$, extended from the latter to the former, and this is the arrangement I prefer in practice; but it is obvious that other arrangements may be adopted and the seat swung back and forth with equal freedom.

Secured to the under side of the seat E, in a depending lug $e'$, is the rear end of a rod F, which extends forward longitudinally of the frame or body A to a point some distance in front of the seat, and is jointed at its forward end by a pin $f$ to the forward end of a connecting-rod or pitman H, the rear end of which is connected to a crank $c$, formed in the shaft C, whereby whenever a swinging or pendulous motion is imparted to the seat by the rider or otherwise a rotary motion will be communicated to said shaft and through it to the wheels B B, the result of which will be to cause the propulsion of the vehicle.

To provide for holding the joint between the forward ends of the rod F and pitman H in proper position with respect to the seat and shaft C, and for insuring the necessary rectilinear movement being imparted thereto when the tricycle is in motion, I make use of a guide-rod I, which, secured at its outer end to the pin $f$, constituting the pintle of such joint, is fitted to slide in a correspondingly-shaped socket L, that is firmly held in the desired position by supports $m$ $m$, extended inward from the frame or body A, as shown. By these means, as will be seen, the proper holding and guiding of the joint is effected, and the easy transmission of power from the seat to the crank in the shaft of the propelling-wheels insured. As thus constructed the propulsion of the vehicle may be effected by the unaided efforts of the rider alone swinging the seat back and forth. I prefer, however, in practice to provide means whereby to assist him in effecting this result, and to that end I make use of a cord or rope M, which, secured at one of its ends to the under side of the seat—as, for instance, to the depending lug $e'$—is passed up over a pulley N near the front of the vehicle and has its other end brought back to the rider, whereby by pulling on which the seat will be drawn forward to its utmost limit. The seat having been brought to that position, the cord or rope will be released and the former allowed to swing backward in the opposite direction, which it will do, aided by the efforts of the rider. The backward limit of movement of the seat having been reached, another pull on the cord or rope will cause the seat to again swing forward, and thus through a succession of such pulls and releases the swinging of the seat, and through it the propulsion of the tricycle, is effected.

The position at which the pulley N is located may be varied as the circumstances may require or the convenience of the constructer demand, it only being essential that it be located at a point some little distance in front of the seat. I prefer, however, to mount it on a girth or support O, extended across the frame or body midway between the uprights $a\ a$ and the pivot of the fork D, as the girth in such case also serves as a foot-rest, against which the rider's feet may rest and press when propelling the machine.

To further aid in swinging the seat when it is desired to operate the vehicle, I sometimes find it advantageous to arrange in the girth O or other convenient support a spring or springs $l$, against which a projection or projections $m'$, secured to the seat, strikes or strike when such seat is near the limit of its forward movement, the effect of which is to drive or force the seat backward, and thereby supplement the action of the rider in drawing the seat forward by the aid of the cord or rope M. In some cases I find that a single spring will be sufficient for this purpose, and such is within the scope of my invention; but I prefer to employ two, as a more even motion is imparted to the seat and the tendency of the same to turn sidewise is thereby avoided.

When the tricycle is in motion, its guiding will be effected by turning the fork D, in which the wheel B' is journaled, to the right or left, as may be desired, and to aid in the turning of such fork I secure in its upper end a rod P, which is bent backward toward the seat F and is provided at its free end with a suitable handle $d$ within easy reach of the rider.

With the parts constructed as above described the operation of the tricycle will be as follows: The rider, being seated in the seat E, will impart thereto a swinging motion by alternately pulling upon and loosening the cord N and pressing with his feet against the girth O, the effect of which will be to cause the seat to swing back and forth under the cross-bar or girth $a'$, the movement being aided therein by the spring or springs $l$. The movement thus imparted to the seat will, through the rod F and the pitman H, be communicated to the crank $c$ in the shaft C, and through it to the driving-wheels B B. As a result of this, the propulsion of the tricycle will be effected and its movement continued as long as the swinging of the seat is continued, its guiding at the same time being accomplished by simply turning the wheel B' to the right or left, as may be desired, through the intermediary of the rod P.

From the foregoing it will be seen that I produce a tricycle which not only combines within itself a vehicle that is easy of operation, but also an exercising-machine in which the healthful exercise of the muscles of the arms, legs, and body may all be effected.

Although in the above I have described the best means contemplated by me for carrying my invention into practice, I wish it distinctly understood that I do not limit myself strictly thereto, as it is obvious that I may modify the same in many of its details without departing from the spirit thereof.

Having thus described one embodiment of my invention, what I claim as new, and desire to secure by Letters Patent of the United States, is—

1. The combination, with a frame or body having an upright frame erected thereon, a shaft journaled near the rear of the last-mentioned frame or body and provided with a crank formed therein, and driving-wheels fixedly secured to the ends of said shaft, of a seat suspended in such upright frame, a rod and pitman intermediate said seat and crank, and means for insuring a proper rectilinear movement being imparted to the joint between the forward ends of the rod and pitman, whereby when the seat is swung back and forth a rotary motion is communicated therefrom to said shaft, substantially as described.

2. The combination, with a frame or body having an upright frame erected thereon and a seat suspended in such upright frame, of a cord or rope for drawing the seat forward and a spring for driving it back, substantially as described.

3. The combination, with a frame or body having an upright frame erected thereon, a seat suspended in such upright frame, and a pulley, of a cord secured at one end to said seat and passed around such pulley, with its other end extended backward toward the seat, substantially as described.

4. The combination, with a frame or body having an upright frame erected thereon, a shaft arranged to be rotated in bearings secured to the rear of the first-mentioned frame or body and provided with a crank formed therein, and a swinging seat suspended in the upright frame, of a rod F, secured at one end to said seat, a pitman H, to which its forward end is jointed, a guide-rod I, secured to such joint, and a socket L, in which such guide-rod operates, substantially as described.

In testimony whereof I have hereunto set my hand this 24th day of November, 1891.

THOMAS McCORMICK.

Witnesses:
SYLVANUS L. TRIPP,
ROBERT CURREN.